UNITED STATES PATENT OFFICE.

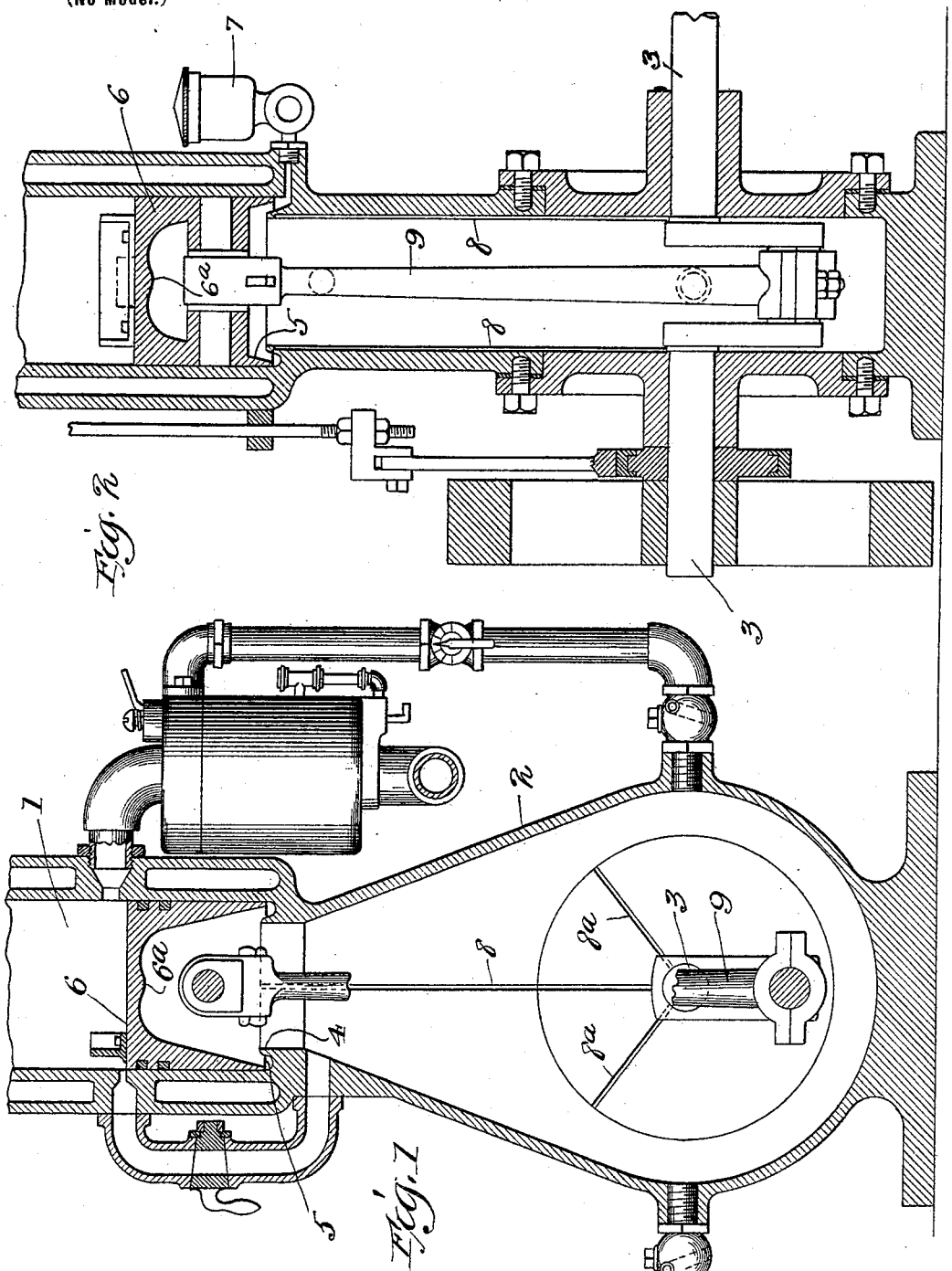

HUBERT F. PROBERT, OF CHICAGO, ILLINOIS, ASSIGNOR TO CHARLES H. MORSE, OF SAME PLACE.

LUBRICATOR FOR GAS-ENGINES.

SPECIFICATION forming part of Letters Patent No. 642,366, dated January 30, 1900.

Application filed May 20, 1899. Serial No. 717,672. (No model.)

*To all whom it may concern:*

Be it known that I, HUBERT F. PROBERT, a citizen of the United States, residing at Chicago, in the county of Cook and State of Illinois, have invented certain new and useful Improvements in Lubricators for Gas-Engines, of which the following is a full, clear, and exact specification.

My invention relates more particularly to lubricators for that class of gas-engines in which the explosion occurs on one side only of the piston, the cylinder at the opposite side being open usually to a mixing-chamber in which the crank and pitman operate; and my invention has for its primary object to provide improved means whereby at each stroke of the piston a quantity of the lubricant will be uniformly distributed over the inner surface of the cylinder and will also be driven to a point where it may readily find its way to the pitman-pin.

With these ends in view my invention consists in certain features of novelty in the construction, combination, and arrangement of parts by which the said objects and certain other objects hereinafter appearing are attained, all as fully described, with reference to the accompanying drawings, and more particularly pointed out in the claims.

In the said drawings, Figure 1 is a vertical longitudinal sectional view of a gas-engine provided with my improved lubricator, and Fig. 2 is a similar section taken at right angles to the plane of the section of Fig. 1.

1 represents the engine-cylinder mounted upon the upper end of a closed crank-chamber 2, which constitutes the mixing-chamber, in which the crank and crank-shaft 3 are located and journaled. The lower end of the cylinder 1 communicates directly with the crank-chamber 2, and at the intersection of the two parts is located or formed an annular upturned flange 4, which constitutes an oil channel or groove, into which the lower attenuated edge 5 of the piston 6 dips at each revolution of the shaft, thus becoming coated with a quantity of the oil or lubricant in the channel 4 and distributing the same uniformly throughout the circumference and length of the cylinder at each stroke of the piston. This oil-channel may be supplied from the outside by any suitable feed-cup 7, and in order that the journals of the shaft 3 may be automatically lubricated by any overflow from the channel 4, resulting from a too copious supply from the cup 7, the sides of the chamber 2 are provided with vertical channels or grooves 8 on each side, which continuously convey a small quantity of the oil downwardly to the point of bearing of the shaft 3, while diagonal or inclining grooves $8^a$ may be formed in the side walls and converge to the point of bearing of the shaft 3 for catching any oil that might leak down the side walls out of line with the channel 8.

The bottom or lower end of the piston is open and its walls converge upwardly, as better shown in Fig. 1, while the top of the piston is closed like the bottom of a cup, and, if desired, immediately over the upper end of the pitman it may be formed with a slight protuberance $6^a$, which will encourage the oil to concentrate at the center of the cup-shaped piston and drop off onto the pin of the pitman. When the piston descends and dips into the oil in the groove 4, it will carry a portion of the same up over the surface of the cylinder and a part will adhere to the inner side of the converging walls of the piston, and as the piston again descends a portion of the lubricant will be forced upwardly along the converging walls of the piston and deposited upon the pitman and the pitman-pin 9 in sufficient quantity to keep these parts fully lubricated, a part of the oil running down the pitman to the crank-pin. This upward trend of the oil on the inner wall of the piston is due, it will be seen, to the fact that when the piston starts downward it will scoop up the lubricant on the walls of the cylinder and in thus rapidly descending while such particles of the lubricant tend to remain at rest will project itself below the lubricant and give the latter a relatively upward movement or a higher position with reference to the height of the piston, thereby gradually working the oil to the crown or top of the piston, whence it drips off onto the parts to be lubricated when accumulated in sufficient quantity.

Having thus described my invention, what I claim as new therein, and desire to secure by Letters Patent, is—

1. In a lubricator for gas-engines the combination of a cylinder provided with a lubricant-channel around its lower end, a piston arranged in said cylinder and having its lower edge attenuated or sharpened and dipping into said channel and its lower end formed in the shape of an inverted cup whose walls gradually converge toward the top of the cup which is unobstructed to permit the lubricant to work its way to the extreme crown or top of the cup, a crank-pin pivoted across said cup in said piston at a distance below the top of the cup, a crank pivoted on said pin and means for supplying said channel with lubricant, substantially as set forth.

2. In a lubricator for gas-engines the combination of a cylinder provided with a lubricant-channel around its lower end, a closed cup-shaped piston located in said cylinder and having the protuberance 6ª in the upper end thereof and a sharpened or attenuated edge at its lower end adapted to dip into said channel and means for supplying said channel with lubricant, substantially as set forth.

3. In a lubricator for gas-engines the combination of a cylinder provided with a lubricant-channel around its lower end, a piston located in said cylinder and having an attenuated edge dipping into said channel, means for supplying said channel with lubricant, a crank-chamber, a crank journaled in said chamber and connected to said piston, the walls of said crank-chamber being provided with a groove extending downwardly from said lubricant-channel to the journals of said crank, substantially as set forth.

4. In a lubricator for gas-engines the combination of a cylinder provided with a lubricant-channel around its lower end, a piston located in said cylinder and having an attenuated edge dipping into said channel, means for supplying said channel with lubricant, a crank-chamber, and a crank journaled in said chamber, the walls of said crank-chamber having a groove extending downwardly from said oil-channel to the point of bearing of said crank and also having an inclined groove extending from the point of bearing of said crank upwardly, substantially as set forth.

HUBERT F. PROBERT.

Witnesses:
F. A. HOPKINS,
EDNA B. JOHNSON.